Figure 1:
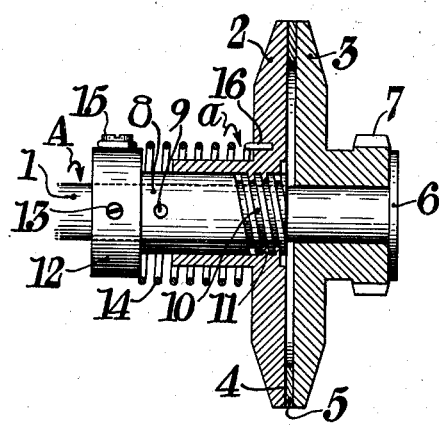

March 28, 1939.  R. W. WENGEL ET AL  2,151,724
FRICTION CLUTCH
Filed Jan. 12, 1937

Henry Gordon Taylor &
Raymond W. Wengel,
INVENTORS:
Newton M. Perrins
George A. Gillette, Jr.
ATTORNEYS.

Patented Mar. 28, 1939

2,151,724

UNITED STATES PATENT OFFICE 2,151,724

FRICTION CLUTCH

Raymond W. Wengel, Rochester, N. Y., and Henry Gordon Taylor, Wellesley, Mass.

Application January 12, 1937, Serial No. 120,248

3 Claims. (Cl. 64—30)

This invention relates to clutches, and, more particularly to clutches of the type that transmit power through frictional engagement of the clutch members.

Clutches of the friction type, as known heretofore, have been constructed so as to maintain engagement during operation, regardless of the weight of the load to be carried or of the suddenness of acceleration, up to the breaking point of the material of the clutch or to the limit of the angle of friction between the friction members beyond which said friction members start slipping and unduly wear the friction surfaces.

In friction clutches of the one-way type, as known heretofore, there has been a momentary lag between the clutch members when starting or stopping. This lag has caused considerable difficulty when such clutches were used in precision machinery.

Having in mind the defects of the prior art friction clutches, it is the primary object of our invention to provide a friction clutch adapted to maintain a constant torque between the clutch members regardless of the rate of acceleration or the weight of the load to be carried.

Another object of our invention is to provide, in a clutch of the type described, means to axially displace the clutch members with respect to each other upon sudden acceleration, a sudden change in load, or upon being overloaded.

A further object of our invention is to provide, in a clutch of the type described, means to resiliently displace the clutch members so that a constant frictional engagement is maintained.

A still further object of our invention is to provide, in a clutch of the type described, means for maintaining a constant frictional engagement between the clutch members, said means being adjustable so that the amount of the torque between said clutch members may be adjusted according to the strength of the clutch and the speed and load to be maintained.

A still further and more specific object of our invention is to provide a friction clutch which may be used as a one-way clutch, and in such use substantially eliminates lag in starting or stopping.

The foregoing objects and others ancillary thereto we accomplish in a friction clutch according to a preferred embodiment of our invention, by providing a guide means and a resilient means operatively connected between the source of power and the driving clutch member for resiliently causing relative axial movement of the clutch members upon relative rotation therebetween so that a constant torque is maintained between the clutch members.

The novel features that we consider characteristic of our invention are set forth with particularity in the appended claims. The invention itself, however, both as to its organization and its method of operation, together with additional objects and advantages thereof, will best be understood from the following description of specific embodiments when read in connection with the accompanying drawing, in which similar reference characters indicate like parts throughout.

Fig. 1 of the drawing is a partial cross-sectional view taken on a plane vertically bisecting the clutch members.

Figure 2:
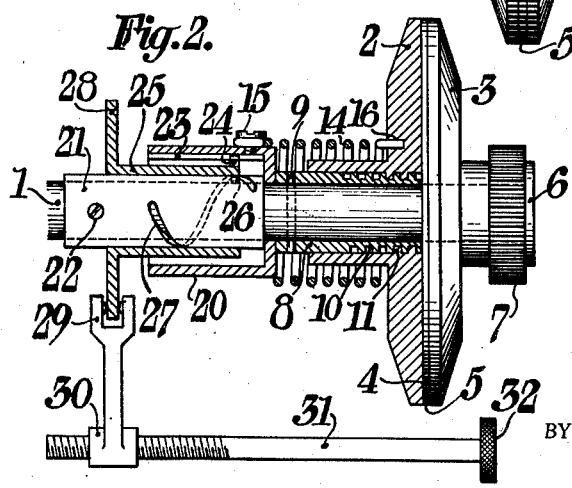

Fig. 2 of the drawing is a partial cross-sectional view, taken on a plane vertically bisecting the clutch, of preferred form of our constant torque friction clutch including a means for adjusting the degree of the torque while the clutch is in operation.

Figure 3:
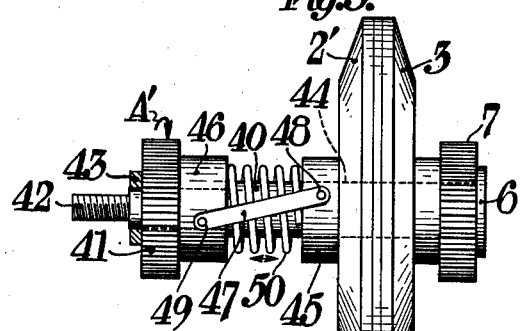
Figure 4:
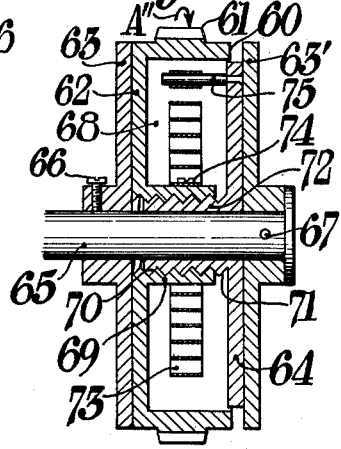

Fig. 3 of the drawing is a view in elevation of a modified form of our constant torque friction clutch, and Fig. 4 of the drawing is a cross-sectional view taken on a plane vertically bisecting the clutch of still another modification of our constant torque friction clutch.

A friction clutch to overcome the defects hereinbefore enumerated must have a totally different characteristic; it must be capable of maintaining a constant friction between the clutch plates and thereby transmitting a constant torque. Accordingly, a preferred embodiment of our invention, referring to Fig. 1, comprises a power driven shaft 1 supporting a driving friction clutch member 2 and a driven friction clutch member 3. The shaft 1 is driven in the direction shown by the arrow A. The clutch members may be of any desired type and are shown as conventional friction discs. The driving clutch member 2 is provided with a friction surface 4 to engage a friction ring 5 carried by the driven clutch member 3. The driven clutch member 3 is freely mounted upon the shaft 1 but is axially restrained by a cap 6 mounted upon the end of said shaft 1. The driven clutch member 3 is provided with a power take-off such as a gear 7.

The driving clutch member 2 is supported by a sleeve 8 that is in turn, mounted upon the drive shaft 1. This sleeve 8 is positively fixed to the shaft 1 by a pin 9. The interior end portion of this sleeve 8, supporting the driving clutch member 2, is provided with external threads 10. These external threads 10 cooperate with internal threads 11, carried within a portion of the driving clutch member 2 to direct or guide said driving clutch member 2 toward or away from the driven clutch member 3. These threads 10 and 11 are arranged so that the driving clutch member 2 will screw into contact with the driven clutch member 3 in the same direction as that of the drive as shown by the arrow a. Adjacent the exterior end of the sleeve 8 is a collar 12 fixed to the shaft 1 by a set screw 13 to permit angular adjustment of said collar.

Operatively mounted between the driving clutch member 2 and the collar 12 is a helical spring 14. This spring 14 is anchored at one end to the collar 12 by a screw 15, the other end of said spring 14 is seated within a socket 16 in the driving clutch member 2. The helical spring 14 produces a torque in the same direction as the drive of the shaft, as shown by the arrow, between the collar 12 and the driving clutch member 2. This torque urges said driving clutch member 2 along the inter-meshing threads 10 and 11 into frictional engagement with the driven clutch member 3.

The operation of this clutch is unique. The helical spring 14 produces a torque, with respect to the collar 12 the shaft 1 and the sleeve 8, and transmits said torque in the direction shown by the arrow A to the driving clutch member 2. As the driving clutch member 2 is mounted on the sleeve 8, the torque produced by the spring 14 tends to urge said clutch member 2 along their intermeshing threads 10 and 11, and into constant frictional engagement with the driven clutch member 3. As the helical spring 14 is fixed to the collar 12 which is in turn, fixed to the drive shaft 1, it follows that the shaft 1 will rotate the collar 12 which will rotate the spring 14. This rotation, and also the torque produced by said spring 14 are transmitted to the driving clutch member 2, the torque urging said driving clutch member 2 into constant frictional engagement with the driven clutch member 3, whereby to transmit the rotation received from the spring 14, collar 12, sleeve 8 and drive shaft 1.

It is evident that when the angle of friction between the friction surfaces 4 and 5 of the driving clutch member 2 and the driven clutch member 3 exceeds a predetermined maximum, due to acceleration or overload, the driving clutch member 2 will be wound slightly away from the driven clutch member 3 and against the torque of the spring 14, so that a constant torque or angle of friction will be maintained between said clutch members. In other words, if the resistance to rotation of the driven clutch member 3 and its associated load is greater than the torque transmitted by the helical spring 14, the driving clutch member 2 will be wound away from said driven clutch member 3 thereby preventing an increase of friction therebetween. Thus for loads above a certain minimum the torque transmitted through the clutch is constant and determined by the torque produced by the helical spring 14. Likewise if the shaft 1 is given a sudden acceleration, the driving clutch member 2 will, by its inertia, be screwed away from the driven clutch member 3 and will prevent the sudden character of the acceleration from being transmitted thereto.

The torque maintained by this clutch is determined by the weight and tension of the helical spring 14. For relatively great adjustments in the torque of the clutch the spring 14 may be changed for a heavier or lighter spring. For finer adjustments, however, the spring 14 may be fixed under a greater or lesser tension by loosening the set screw 13 and changing the angular position of the collar 12 to either wind or unwind said spring 14.

It is often desirable, in precision machinery, to make a relatively fine adjustment of the torque transmitted by the clutch. These adjustments can best be made while the clutch is in operation so as to definitely measure the torque transmitted through the clutch. Such adjustments can be made by the arrangement shown in Fig. 2. A clutch such as heretofore described is provided with a cup shaped member 20 to supplant the collar 12. The outer end of the helical spring 14 is fixed to this cup member 20 by a screw 15 as it is to the collar 12 in the hereinbefore described mechanism. This cup member 20 is freely mounted upon the shaft 1 but axially located thereon by the sleeve 8 and a cam sleeve 21 which is fixed to the shaft 1 by a set screw 22. A pair of rails 23 extend longitudinally of the interior surface of the cup member 20 to form a slot or key way to receive a travelling key 24.

The key 24 is carried by a travelling sleeve 25 which is mounted on the cam sleeve 21 and extends within the cup member 20. A pin 26 is carried within the travelling sleeve 25 and is adapted to cooperate with a helical cam slot 27 cut into the cam sleeve 21. The outer end of the travelling sleeve 25 is formed into a flange 28. The periphery of the flange 28 is straddled by a yoke 29 having a ball-bearing contact therewith. The yoke 29 is carried by a sleeve 30 which is threaded on a long bolt 31 terminating in a hand wheel 32.

The cup member 20 having one end of the helical spring attached thereto, and being freely mounted upon the shaft 1, is positioned angularly by the key 24 riding in the slot formed by the rails 23 within said cup member 20. The travelling sleeve 25, carrying the key 24 is positioned angularly by the pin 26 which it likewise carries and which rides within the helical cam slot 27 cut into the cam sleeve 21, which is fixed to the shaft 1 by the set screw 22.

To change the tension of the helical spring 14, and the consequent torque transmitted by the clutch, while the clutch is in operation the operator merely has to turn the hand wheel 32. By turning the hand wheel 32 the bolt 31 will likewise be turned and the yoke sleeve 30 will be threaded therealong. As the yoke sleeve 30 moves it will carry the yoke 29 which will move the flange 28 and travelling sleeve 25 along the cam sleeve 21. As the travelling sleeve 25 is moved axially along the cam sleeve 21, the pin 26 carried by said travelling sleeve 25 will follow the helical path of the cam slot 27 in the cam sleeve 21. In following this helical cam slot 27, the pin 26 will cause the travelling sleeve 25 to rotate slightly. This rotation will not be hampered by the yoke 29 due to the ball-bearing connection therebetween. As the travelling sleeve 25 turns it will carry the key 24 which will likewise turn the cup member 20 by the connection between said key 24 and the key way formed by the rails 23 on the interior surface of said cup member 20. As the key way between said rails 23 extends the length of the cup member 20, the key 24 will be permitted the axial movement that the travelling sleeve 25 receives from the yoke 29. As the cup member 20 is caused to turn or rotate it will wind or unwind the helical spring 14 to increase or decrease the tension of said spring 14 and consequently change the degree of torque transmitted by the clutch. It may readily be seen that this manner of adjusting the torque of the clutch while said clutch is in operation will permit a very fine adjustment thereof.

A modification of the preferred embodiment of our clutch is shown in Fig. 3. This modified clutch is shown as being mounted upon a stud 40 and receiving power through a gear 41. The stud 40 is provided with a threaded portion 42 and a washer 43 for mounting purposes. The driven clutch member 3 is identical to the forementioned clutch, it being provided with a friction ring 5, and a gear 7, and being axially restrained by a cap 6 on the end of the stud 40. The driving clutch member 2' differs only in the fact that it does not have internal threads but may have any ordinary type of bearing 44 to ride on the stud 40.

The driving clutch member 2' and the power gear 41 are both provided with rather thick collars, 45 and 46 respectively, facing each other on the stud 40. One or more links 47 extend between the collars 45 and 46 of the driving clutch member 2' and the power gear 41. One end of the link 47 is pivotally mounted on a pin 48 imbedded in the periphery of the collar 45 of the driving clutch member 2'. The other end of the link is similarly mounted on a pin 49 carried by the collar 46 of the power gear 41. This link 47 is made from a thin pliable strip of material so that it may be twisted or bent in a slightly helical manner. As the link 47 is slightly longer than the axial distance between the pins 48 and 49 upon which it is pivotally mounted, said link is never permitted to straighten out parallel to the stud 40.

A spiral spring 50 is operatively located between the collars 45 and 46 of the driving clutch member 2' and the power gear 41. This spring 50 exerts a pressure against said collars 45 and 46. As the power gear 41 is spaced on the stud 40 by the washer 43, the pressure of the spiral spring 50 must necessarily be expended on the driving clutch member 2' to resiliently urge it into frictional engagement with the driven clutch member 3.

In operation this modified clutch is even simpler than the preferred embodiment shown in Fig. 1. Power in the direction of the arrow A' is received through the power gear 41 which pulls the link 47 along with it. The link 47, of course, pulls the driving clutch member 2' around the stud 40. Due to friction and inertia the driving clutch member 2' has a natural tendency to drag, swing the link 47 on its pivots 48 and 49 and move along the stud 40 toward the power gear 41. This reaction is offset by the spiral spring 50 which resiliently urges the power gear 41 and the driving clutch member 2' apart. As their axial movement is limited by the washer 43 and the driven clutch member 3, the driving clutch member 2' is urged into frictional engagement with said driven clutch member 3.

The torque transmitted by this clutch is determined by the strength of the spiral spring 50 and the length of the space within which it is compressed. The effect of this clutch is identical to that of the preferred embodiment shown in Fig. 1. If the resistance to rotation of the driven clutch member 3 is greater than the torque transmitted by the spiral spring 50 and the link 47, the friction between the clutch members will tend to increase. The tendency toward increased friction will cause the driving clutch member 2' to drag and consequently to swing away from the driven clutch member 3 by the link 47 and against the pressure of the spiral spring 50. Thus for loads above a certain minimum the torque transmitted by the clutch remains constant.

Another modification of my constant torque clutch is shown in Fig. 4. This clutch is of a somewhat different design but the principle remains the same as in the structures hereinbefore described. This clutch comprises a driving clutch member 60 in the form of a drum. The driving drum 60 is provided with a gear segment 61 about its periphery to receive power from any desirable source. The driving drum 60 comprises a cup shaped shell 68, including a side wall 62 adapted to frictionally engage a driven clutch member 63, and a plate 64 adapted to freely fit within the peripheral wall of said drum 60 and to frictionally engage another driven clutch member 63'. The driving drum 60 and the driven clutch members 63 and 63' are all mounted on a shaft 65. The driving drum 60 is freely mounted on said shaft, the driven clutch member 63 is fixed to said shaft 65 by a set screw 66, and the driven clutch member 63' is fixed to said shaft 65 by a pin 67.

The shell portion 68 of the drum 60 is provided with an internally extending collar 69 which is provided with internal threads 70. These internal threads 70 are adapted to cooperate with external threads 71 carried by a collar 72 extending internally, with respect to the drum 60, from the plate 64. This collar 72 may comprise the free bearing on the shaft 65. By this method of mounting the shell 68 and the plate 64 may be wound toward or away from each other.

Mounted within the driving drum 60 is a coil spring 73. This spring 73 is coiled about the collar 69 of the shell 68, the inner end of said spring is attached to said collar 69 by a screw 74 and the outer end is hooked about a pin 75 carried by the plate 64.

The coil spring 73 tends to unwind and consequently urges the shell 68 and plate 64 about their threaded portions 70 and 71 and away from each other. By virtue of such unwinding of said shell 68 and plate 64, they are resiliently urged into frictional engagement with the driven clutch members 63 and 63'.

The gear segment 61 receives power from any desired source and is rotated in the direction of the arrow A''. This rotation will tend to wind the shell 68 and the plate 64 together. The coil spring 73, however, will keep said shell 68 and plate 64 wound apart and in frictional engagement with the driven clutch members 63 and 63'. As the friction surfaces 62 and 64 of the driving drum 60 are frictionally engaged with the driven clutch members 63 and 63', the rotation received by said driving drum 60 through said power gear 61 will be transmitted to said driven clutch members 63 and 63'. If, however, the resistance to rotation of the driven clutch members 63 and 63' is greater than the torque of the coil spring 73, the shell 68 and plate 64 will be wound together against said spring torque to reduce the friction between said friction members.

The torque transmitted by the clutch is, of course, determined by the weight and tension of the coil spring 73. This torque may be adjusted slightly by changing the limit to which the shell 68 and plate 64 may be unwound. This limit may be changed, of course, by adjusting the spacing of the driven clutch members 63 and 63' on the shaft 65. The set screw 66 on the driven clutch member 63 is provided to permit such adjustment of said clutch member 63, whereby to adjust the torque transmitted through the clutch.

It is readily evident that our constant torque friction clutches incorporate certain principles which are common to all of the types shown. There is a guide means associated with the driving clutch member for prescribing a path toward or away from the driven clutch member. In the preferred embodiment of our clutch shown in Fig. 1 this guide means is in the form of the intermeshing threads 10 and 11. In the first modification shown in Fig. 3 the pivotally mounted link 47 forms the guide means and in the second modification shown in Fig. 4 the guide means comprise another form of intermeshing threads 70 and 71.

Secondly, there is a resilient means for urging the driven clutch member through the paths prescribed by the guide means and into frictional engagement with the driven clutch member. This resilient means comprises the helical spring 14 in Fig. 1, the spiral spring in Fig. 3, and the coil spring 73 in Fig. 4. The resilient means is primarily responsible for determining the constancy of the torque transmitted through the clutch, and said torque may be adjusted by changing the weight or tension of said resilient means.

The power received from any desirable source may be primarily transmitted to the driving clutch member by either the resilient means or the guide means. According to the preferred embodiment shown in Fig. 1, the resilient means is primarily responsible for transmitting power to the driving clutch member. In the modification shown in Fig. 3, however, the guide means transmits the power to the driving cluch member.

It is also readily evident to those versed in the art that the guide means and the resilient means need not necessarily be located between the source of power and the driving clutch member, but may equally well be placed between the driven clutch member and the power take-off associated therewith. In changing the positions of these means the direction of the guide means and of the pressure of the resilient means need only be reversed to the direction in which they are shown in the accompanying drawing.

The advantages and uses of this type of clutch are innumerable and should be quite evident to those versed in the art. If used as a straight clutch, this type of construction eliminates all strain to the parts thereof and reduces wear of the friction members to a minimum. The torque transmitted by the clutch is constant so that there will never be any variation in the forces acting upon the apparatus associated with said clutch or strain imposed upon the parts of said apparatus.

Although we have shown and described certain specific embodiments of our invention, we are fully aware that many modifications thereof are possible. Our invention, therefore, is not to be restricted except insofar as is necessitated by the prior art and by the spirit of the appended claims.

Having now particularly described our invention what we desire to secure by Letters Patent of the United States and what we claim is:

1. In a friction clutch assembly, the combination with a shaft, a driving clutch member and a driven clutch member both mounted on said shaft, of guide means operatively connected between said shaft and said driving clutch member and for causing relative axial movement of said clutch members upon relative rotation therebetween, of a collar fastened on said shaft, and of a resilient means interposed between said collar and said driving clutch member, and for moving said driving clutch member under the supervision of said guide means toward said driven clutch member, said collar being adapted for angular adjustment with respect to said shaft whereby the torque maintained between the two clutch members may be regulated.

2. In a friction clutch assembly, the combination with a driven shaft, a driving clutch member and a driven clutch member both mounted on said shaft, said driven clutch member being freely mounted thereon, of a sleeve member fixed on said shaft and for supporting said driving clutch member, an external thread on a portion of said sleeve member, an internal thread within a portion of said driving clutch member, said external and internal threads cooperating to guide said driving clutch member along said sleeve and for causing relative axial movement of said driving clutch member upon relative rotation between said clutch members, and of a collar fastened to said shaft and a coiled spring having its ends fixed to said collar and said driving clutch member respectively and for transmitting a torque to said driving clutch member and for urging said driving clutch member through the path determined by said cooperating threads and also into contact with said driven clutch member, said collar being adjustably mounted upon said shaft whereby to regulate the torque transmitted to said driving clutch member, whereby a constant torque is maintained between the two clutch members.

3. In a friction clutch assembly, the combination with a shaft, a driving clutch member and a driven clutch member both mounted on said shaft, of threads between said shaft and driving clutch member for causing relative axial movement of said driving clutch member upon relative relation between said clutch members, of a collar adjustably mounted on said shaft, of a spring operatively connected between said collar and said driving clutch member and of a control means operatively connected to said collar for adjusting the collar with respect to the shaft, especially during operation of the clutch, and for regulating the torque maintained between said clutch members.

RAYMOND W. WENGEL.
HENRY GORDON TAYLOR.

CERTIFICATE OF CORRECTION.

Patent No. 2,151,724. March 28, 1939.

RAYMOND W. WENGEL, ET AL.

It is hereby certified that error appears in the printed specification of the above numbered patent requiring correction as follows: Page 4, first column, line 25, after "spring" insert the reference numeral 50; same page, second column, line 43, claim 2, strike out the word "also"; line 55, claim 3, for "relation" read rotation; and that the said Letters Patent should be read with this correction therein that the same may conform to the record of the case in the Patent Office.

Signed and sealed this 2nd day of May, A. D. 1939.

Henry Van Arsdale (Seal) Acting Commissioner of Patents.